United States Patent
Park et al.

(10) Patent No.: US 9,131,469 B2
(45) Date of Patent: *Sep. 8, 2015

(54) METHOD AND APPARATUS FOR TRANSMITTING BROADCAST DATA, AND METHOD AND APPARATUS FOR RECEIVING BROADCAST DATA

(71) Applicant: SAMSUNG ELECTRONICS CO., LTD., Suwon-si (KR)

(72) Inventors: Sung-il Park, Suwon-si (KR); June-hee Lee, Seongnam-si (KR); Ga-huyn Ryu, Suwon-si (KR); Jong-hwa Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 13/860,745

(22) Filed: Apr. 11, 2013

(65) Prior Publication Data

US 2013/0223387 A1    Aug. 29, 2013

Related U.S. Application Data

(63) Continuation of application No. 12/544,528, filed on Aug. 20, 2009, now Pat. No. 8,503,335.

(60) Provisional application No. 61/090,407, filed on Aug. 20, 2008.

(30) Foreign Application Priority Data

Jun. 25, 2009    (KR) .................. 10-2009-0057197

(51) Int. Cl.
*H04L 12/16*    (2006.01)
*H04W 72/00*    (2009.01)
*H04H 60/73*    (2008.01)

(52) U.S. Cl.
CPC ............ *H04W 72/005* (2013.01); *H04H 60/73* (2013.01)

(58) Field of Classification Search
CPC ........................... H04W 72/00; H04W 72/005
USPC .................................................. 370/265, 312
See application file for complete search history.

(56) References Cited

U.S. PATENT DOCUMENTS

2006/0039308 A1    2/2006    Kim
2006/0174273 A1*   8/2006    Park et al. .................. 725/41

(Continued)

FOREIGN PATENT DOCUMENTS

CN    1738436 A    2/2006
CN    1777254 A    5/2006

(Continued)

OTHER PUBLICATIONS

Communication dated Jul. 11, 2013, issued by the State Intellectual Property Office of the People's Republic of China, in counterpart Application No. 200980132603.4.

(Continued)

*Primary Examiner* — Sai-Ming Chan
(74) *Attorney, Agent, or Firm* — Sughrue Mion, PLLC

(57) ABSTRACT

A broadcast data transmission method includes generating service composition information of a broadcasting service to be provided using a broadcast packet transmitted through a frequency channel; generating first signaling information indicating an ensemble in which the service composition information is to be transmitted; and transmitting the broadcast packet, the service composition information, and the first signaling information. The service composition information may include at least one of a service identifier for the broadcasting service, genre information representing a genre of the broadcasting service, and information about a provider of the broadcasting service.

31 Claims, 16 Drawing Sheets

(56) References Cited

U.S. PATENT DOCUMENTS

| | | | |
|---|---|---|---|
| 2006/0248563 A1* | 11/2006 | Lee et al. | 725/117 |
| 2007/0050833 A1 | 3/2007 | Park | |
| 2007/0237184 A1 | 10/2007 | Park et al. | |
| 2009/0028272 A1* | 1/2009 | Song et al. | 375/322 |
| 2009/0034556 A1* | 2/2009 | Song et al. | 370/471 |
| 2009/0323683 A1* | 12/2009 | Song et al. | 370/389 |
| 2010/0034140 A1* | 2/2010 | Song et al. | 370/328 |

FOREIGN PATENT DOCUMENTS

| | | |
|---|---|---|
| CN | 1964239 A | 5/2007 |
| CN | 101422040 A | 4/2009 |
| EP | 1079582 A1 | 2/2001 |
| EP | 1734676 A1 | 12/2006 |
| KR | 1020070077000 A | 7/2007 |
| WO | 2005/069624 A2 | 7/2005 |

OTHER PUBLICATIONS

ETSI EN 300 401 V1.4.1, Radio Broadcasting Systems; Digital Audio Broadcasting (DAB) to mobile, portable and fixed receivers, Jun. 2006.

ETSI TS 102 818, V1.4.1, Digital Audio Broadcasting (DAB); Digital Radio Mondial (DRM); XML Specification for Electronics Programme Guide (EPG), Jun. 2008.

TTAS.KO-07.0026/R1, Specification of the video services for Terrestrial Digital Multimedia Broadcasting (DMB) to mobile, portable, and fixed receivers. Dec. 26, 2006.

TTAS.KO-07.0046, Interface Standard for Terrestrial Digital Multimedia Broadcasting (T-DMB) Automatic Emergency Alert Service, Dec. 27, 2006.

International Search Report issued Apr. 6, 2010, in counterpart application No. PCT/KR2009/004623.

Communication dated Jul. 10, 2012 issued by the Canadian Intellectual Property Office in counterpart Canadian Application No. 2,732,953.

Communication, dated Nov. 27, 2012, issued by the State Intellectual Property Office of the P.R.C. in counterpart Chinese Application No. 200980132603.4.

Communication dated Mar. 20, 2014, issued by the Finnish Patent and Registration Office in counterpart Finnish Application No. 20115081.

Communication dated Mar. 31, 2014, issued by the National Office of Intellectual Property in counterpart Vietnamese Application No. 1-2011-00686.

ETSI EN 301 192 V1.4.2 (Apr. 2008). Digital Video Broadcasting (DVB); DVB specification for data broadcasting. European Telecommunications Standards Institute Apr. 2008, 80 pages.

Communication dated Jan. 21, 2015, issued by the State Intellectual Property Office of P.R. China in counterpart Chinese Application No. 201310138607.1.

Communication dated Mar. 20, 2015, issued by the Korean Intellectual Property Office in counterpart Korean Application No. 10-2009-0057197.

* cited by examiner

FIG. 3

| Syntax | No. of Bits | Format |
|---|---|---|
| Channel Description Table( ) { | | |
|     M1_info_type (310) | 5 | 0×02 |
|     reserved | 3 | uimsbf |
| version_number | 4 | uimsbf |
|     M1_info_length | 12 | uimsbf |
| num_channels | | |
|     for (i=0;i<num_channels;i++) { | | |
|         channel_identifier (320) | 16 | uimsbf |
|         channel_type (330) | 4 | uimsbf |
|         virtual_channel_status (340) | 2 | uimsbf |
|         base_channel_indicator (350) | 2 | uimsbf |
|         channel_name_description_length | 8 | uimsbf |
|         short_channel_description( ) (360) | 8*N | uimsbf |
|         channel_descriptor_length | 8 | uimsbf |
|         chanel_descriptor_loop( ) (370) | 8*M | bsibf |
|     } | | |
| } | | |

FIG. 4A

| Syntax | No. of Bits | Format |
|---|---|---|
| FIC_Chunk_Header( ) { | | |
|     transport_stream_id (412) | 16 | uimsbf |
|     ESG_version (414) | 3 | bslbf |
|     IMT_version (416) | 3 | '1' |
|     CDT_version(signaling lower 2bits) (418) | 2 | uimsbf |
| } | | |

FIG. 4B

| Syntax | No. of Bits | Format |
|---|---|---|
| FIC_Chunk_Payload( ) { | | |
| for (i=0; i<num_ensmelbes; i++) { | | |
|    ensemble_id (422) | 8 | uimsbf |
|    reserved | 1 | '1' |
|    primary_ensemble_indicator (424) | 1 | bsibf |
|    SG_entry_point_indicator (426) | 1 | bsibf |
|    SMT_version | 5 | |
|    num_channels (428) | 8 | uimsbf |
|    for (j=0; j<num_channels; j++) { | | |
|       channel_type (432) | 4 | uimsbf |
|       virtual_channel_status (434) | 2 | uimsbf |
|       primary_channel_indicator (436) | 1 | bsibf |
|       SP_indicator (438) | 1 | bsibf |
|       major_channel_num (442) | 8 | uimsbf |
|       minor_channel_num (444) | 8 | uimsbf |
|    } | | |
| } | | |

FIG. 5

| SERVICE IDENTIFIER (8bits) (510) | IP address (520) | ENSEMBLE IDENTIFIER (8bits) (530) |
|---|---|---|
| #1 | 222.0.0.1<br>222.0.0.2 | #1, #3 |
| ... | | |
| #N | 222.0.0.3<br>222.0.0.4 | #N |
| ... | | |
| #M-1 | 252.0.0.1<br>252.0.0.2 | #K, #L |
| #M | 200.0.0.1 | PRIMARY ENSEMBLE |

FIG. 6

| BROADCAST CHANNEL NUMBER (610) | BROADCAST CHANNEL INFORMATION (620) | UPPER-GENRE INFORMATION (630) | LOWER-GENRE INFORMATION (640) |
|---|---|---|---|
| 10-1 | BROADCAST STATION A-SPORTS | SPORTS | BASEBALL |
| 10-2 | BROADCAST STATION A-NEWS | NEWS | ECONOMICS |
| - | MOBILE STREAMER | NAKED IP SERVICE | MOVIE STREAM |
| 12-1 | BROADCAST STATION D | Service Guide | Local SG |
| ... | ... | ... | ... |

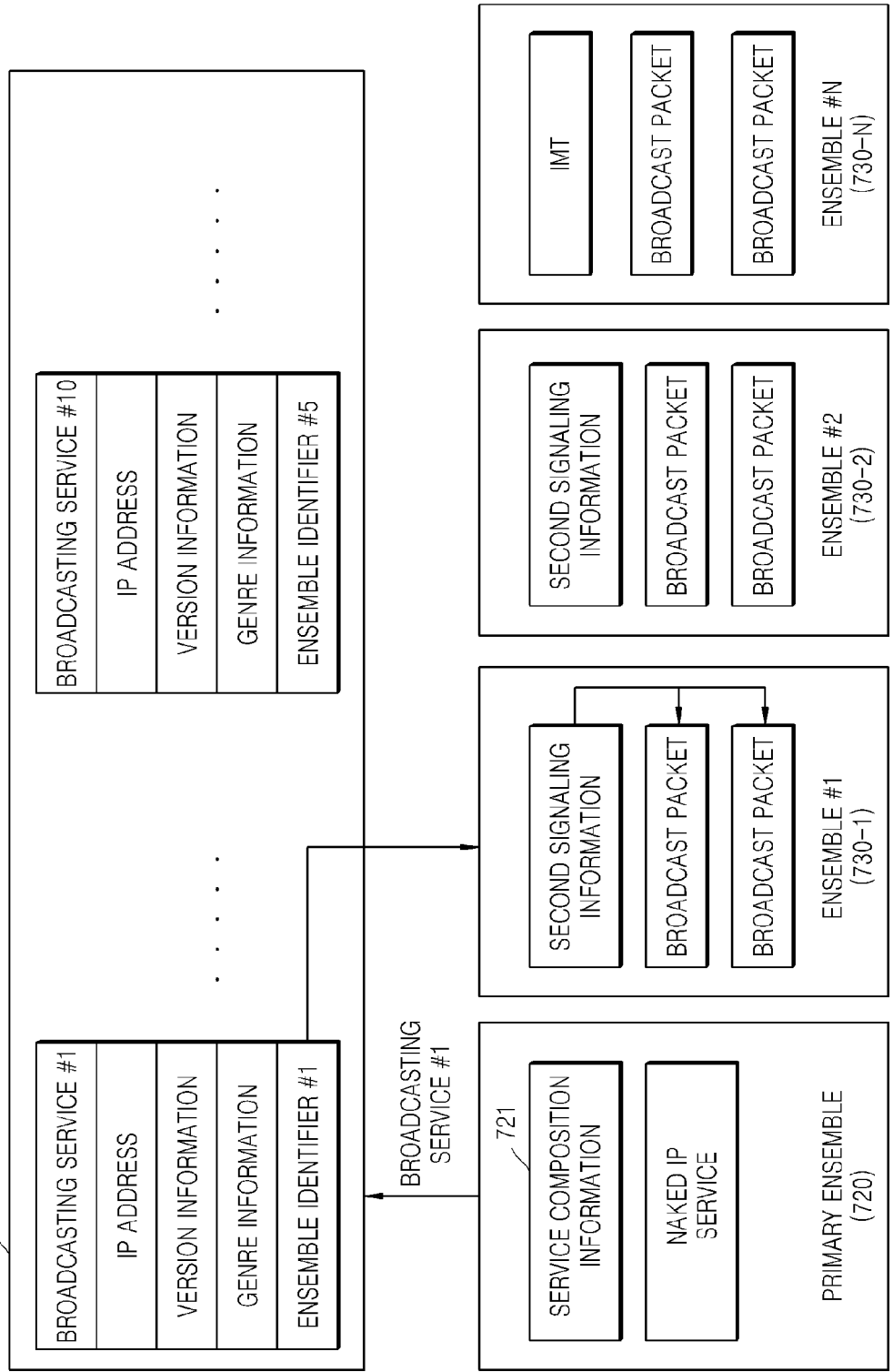

FIG. 12

| Syntax | No. of Bits | Format |
|---|---|---|
| FIC_Chunk_Payload( ) { | | |
|    num_of_descriptor (1210) | | |
|    for (i=0; i<num_of_descritpor;(++) { | | |
|       tag (1220) | 8 | uimsbf |
|       length | 8 | uimsbf |
|       FICdescriptor( ) (1230) | 8*N | uimsbf |
| } | | |

FIG. 13

| tag | No. of Bits | Format |
|---|---|---|
| FIC_descriptor ( ) { | | |
|    tag | 8 | '0×01' |
|    length | 8 | uimsbf |
|    reserved | 4 | uimsbf |
|    version_number | 4 | uimsbf |
|    accident_main_type (1310) | 8 | uimsbf |
|    accident_sub_type (1320) | 8 | uimsbf |
|    ensemble_id (1330) | 8 | uimsbf |
|    accident_description_length | 8 | uimsbf |
|    accident_description( ) (1340) | 8*N | uimsbf |
|    additional_accident_descriptor_length | 8 | uimsbf |
|    additional_accident_descriptor( ) | 8*M | uimsbf |
| } | | |

FIG. 14

| tag | No. of Bits | Format |
|---|---|---|
| FIC_descriptor( ) { | | |
|     tag | 8 | '0×02' |
|     length | 8 | uimsbf |
|     reserved | 4 | uimsbf |
|     version_number | 4 | uimsbf |
|     segmentation_number (1410) | 8 | uimsbf |
|     last_segment_number (1420) | 8 | uimsbf |
|     key_stream_main_type (1430) | 8 | uimsbf |
|     key_stream_sub_type (1440) | 8 | uimsbf |
|     ensemble_id (1450) | 8 | uimsbf |
|     key_stream_length (1460) | 8 | uimsbf |
|     key_stream (1470) | 8 | uimsbf |
|     additional_key_stream_descriptor_length (1480) | 8 | uimsbf |
|     additional_key_stream_descriptor( ) (1490) | 8*M | uimsbf |
| } | | |

METHOD AND APPARATUS FOR TRANSMITTING BROADCAST DATA, AND METHOD AND APPARATUS FOR RECEIVING BROADCAST DATA

CROSS-REFERENCE TO RELATED PATENT APPLICATIONS

This application is a continuation of U.S. patent application Ser. No. 12/544,528 filed on Aug. 20, 2009, which claims priority from U.S. Provisional Application No. 61/090,407, filed on Aug. 20, 2008, and Korean Patent Application No. 10-2009-0057197, filed on Jun. 25, 2009, in the Korean Intellectual Property Office, the disclosures of which are incorporated herein in their entireties by reference.

BACKGROUND OF THE INVENTION

1. Field of the Invention

Methods and apparatuses consistent with the present invention relate to transmitting data and receiving data, and more particularly, to transmitting broadcast data and receiving broadcast data.

2. Description of the Related Art

Due to recent advances in information and communication technologies, broadcast services are offered through various media. In particular, broadcasting services using mobile terminals are drawing attention as mobile communication technologies are being developed.

In addition, as more broadcasting stations provide broadcasting services, viewers are able to select from a larger variety of channels, and thus, more viewers have subscribed to broadcasting services.

Such development in mobile terminals and the increased availability of various broadcast content have greatly contributed to the development of broadcasting systems.

SUMMARY OF THE INVENTION

Exemplary embodiments of the present invention provide a method and apparatus for transmitting broadcast data, and a method and apparatus for receiving broadcast data.

According to an aspect of the present invention, there is provided a broadcast data transmission method including: generating service composition information of a broadcasting service to be provided using at least one broadcast packet transmitted through at least one frequency channel; generating first signaling information indicating an ensemble in which the service composition information is to be transmitted; and transmitting the broadcast packet, the service composition information, and the first signaling information.

The service composition information may include at least one selected from the group consisting of a service identifier for the broadcasting service, genre information representing a genre of the broadcasting service, and information about a provider of the broadcasting service.

The broadcast data transmission method may further include generating second signaling information for each ensemble, the second signaling information being necessary for processing the at least one broadcast packet to be transmitted in each ensemble, wherein the transmitting further includes transmitting the second signaling information in a corresponding ensemble.

The first signaling information may include an Internet protocol (IP) address of the second signaling information necessary for providing the broadcasting service.

The first signaling information may include mapping information between the broadcasting service and the ensemble in which the broadcast packet providing the broadcasting service is to be transmitted.

The first signaling information may include version information of the service composition information.

The transmitting the broadcast packet, the service composition information, and the first signaling information may include transmitting the service composition information in an ensemble indicated by the first signaling information and transmitting the first signaling information through a fast information channel (FIC).

According to another aspect of the present invention, there is provided a broadcast data transmission method including: acquiring urgent information which is prioritized to be received by a broadcast data receiving apparatus; generating signaling information including information necessary for processing a broadcast packet providing a broadcasting service and including the urgent information; and transmitting the signaling information through an FIC.

The urgent information may include at least one selected from the group consisting of accident status information, weather information, and information about decoding the broadcast packets.

The urgent information may include at least one selected from the group consisting of type information representing a type of the urgent information, short description information about the urgent information, and location information of an ensemble in which detailed description information about the urgent information is transmitted.

According to another aspect of the present invention, there is provided a broadcast data receiving method including: acquiring first signaling information indicating an ensemble in which service composition information of a broadcasting service is transmitted; acquiring the service composition information based on the first signaling information; and providing the broadcasting service based on the service composition information and the first signaling information, wherein the service composition information is information on the composition of the broadcasting service to be provided by using a broadcast packet transmitted through at least one frequency channel.

The service composition information may include at least one selected from the group consisting of a service identifier for the broadcasting service, genre information representing a genre of the broadcasting service, and information about a provider of the broadcasting service.

The providing the broadcasting service may include: creating a list of broadcast services to be provided based on the service composition information; controlling displaying of the list of broadcasting services; and if one of the broadcasting services in the list is selected, accessing an ensemble in which a broadcast packet providing the selected broadcasting service is transmitted.

The providing the broadcasting service may further include: acquiring second signaling information from the accessed ensemble, the second signaling information including information necessary for processing the broadcast packet providing the selected broadcasting service; and processing the broadcast packet providing the selected broadcasting service using the second signaling information.

The first signaling information may include an IP address of the second signaling information.

The first signaling information may further include mapping information between the broadcasting service and an ensemble in which the broadcast packet providing the broadcasting service is transmitted.

The first signaling information may further include version information of the service composition information.

The acquiring the first signaling information may include acquiring the first signaling information through an FIC.

According to another aspect of the present invention, there is provided a broadcast data receiving method including: receiving signaling information including urgent information which is prioritized to be received, and information necessary for processing a broadcast packet providing a broadcasting service from an FIC; and acquiring the urgent information from the signaling information.

The urgent information may include at least one selected from the group consisting of accident status information, weather information, and information on decoding the broadcast packets.

The urgent information may include at least one selected from the group consisting of type information representing a type of the urgent information, short description information about the urgent information, and location information of an ensemble in which detailed description information about the urgent information is transmitted.

According to another aspect of the present invention, there is provided a broadcast data transmission apparatus including: a service composition information generation unit generating service composition information of a broadcasting service to be provided by using a broadcast packet transmitted through at least one frequency channel; a signaling information generation unit generating first signaling information indicating an ensemble in which the service composition information is to be transmitted; and a transmission unit transmitting the broadcast packet, the service composition information and the first signaling information.

According to another aspect of the present invention, there is provided a broadcast data transmission apparatus including: an information acquisition unit acquiring urgent information which is prioritized to be received by a broadcast data receiving apparatus; an information generation unit generating signaling information including information necessary for processing a broadcast packet providing a broadcasting service and including the urgent information; and a transmission unit transmitting the signaling information through an FIC.

According to another aspect of the present invention, there is provided a broadcast data receiving apparatus including: a signaling information acquisition unit acquiring first signaling information indicating an ensemble in which service composition information of a broadcasting service is transmitted; a service composition information acquisition unit acquiring the service composition information based on the first signaling information; and a service providing unit providing the broadcasting service based on the service composition information and the first signaling information, wherein the broadcasting service is provided using a broadcast packet transmitted through at least one frequency channel.

According to another aspect of the present invention, there is provided a broadcast data receiving apparatus including: a signaling information reception unit receiving signaling information including urgent information which is prioritized to be received, and information necessary for processing a broadcast packet providing a broadcasting service from an FIC; and an urgent information acquisition unit acquiring the urgent information from the signaling information.

According to another aspect of the present invention, there is provided a broadcast data transmission method including: transmitting first signaling information through a fast information channel; transmitting a primary ensemble including service composition information; and transmitting a second ensemble including second signaling information and at least one broadcast packet, wherein the primary ensemble and the second ensemble are data transmission units that are divided according to an error coding unit, wherein the first signaling information includes a link to the primary ensemble, and wherein the service composition information includes information on broadcasting services provided by the at least one broadcast packet.

The second signaling information may include one of an Internet protocol mapping table and a service mapping table for processing the at least one broadcast packet.

The fast information channel may be a third ensemble coded to be more robust against errors than the primary ensemble and the second ensemble.

According to another aspect of the present invention, there is provided a broadcast data transmission apparatus including: a first signaling information generation unit which generates first signaling information including a link to a primary ensemble; a primary ensemble generation unit which generates a primary ensemble including service composition information; a second ensemble generation unit which generates a second ensemble including second signaling information and at least one broadcast packet; and a transmission unit which transmits the first signaling information, the primary ensemble, and the second ensemble, wherein the primary ensemble and the second ensemble are data transmission units that are divided according to an error coding unit, and wherein the service composition information includes information on broadcasting services provided by the at least one broadcast packet.

The transmission unit may transmit the first signaling information through a fast information channel.

The fast information channel may be a third ensemble coded to be more robust against errors than the primary ensemble and the second ensemble.

According to another aspect of the present invention, there is provided a broadcast data receiving method including: acquiring first signaling information transmitted through a fast information channel and including a link to a primary ensemble including service composition information; acquiring the service composition information based on the first signaling information; and providing a broadcasting service based on the service composition information and the first signaling information, wherein the primary ensemble is a data transmission unit that is divided according to an error coding unit, and wherein the service composition information includes information on broadcasting services provided by at least one broadcast packet included in a second ensemble.

The primary ensemble may be accessed before the second ensemble.

The method may further comprise the step of: providing a list of broadcasting services using the acquired service composition information; receiving a selection of a broadcasting service from a user; and providing the selected broadcasting service.

According to another aspect of the present invention, there is provided a broadcast data receiving apparatus including: a signaling information acquisition unit which acquires first signaling information transmitted through a fast information channel and including a link to a primary ensemble including service composition information; a service composition information acquisition unit which acquires the service composition information based on the first signaling information; and a broadcast service providing unit which provides a broadcasting service based on the service composition information and the first signaling information, wherein the primary ensemble is a data transmission unit that is divided according to an error coding unit, and wherein the service composition information includes information on broadcasting services provided by at least one broadcast packet included in a second ensemble.

BRIEF DESCRIPTION OF THE DRAWINGS

The above and other aspects of the present invention will become more apparent by describing in detail exemplary embodiments thereof with reference to the attached drawings in which:

FIG. 3 illustrates syntax of service composition information according to an exemplary embodiment of the present invention;

FIG. 4A illustrates a header of first signaling information according to an exemplary embodiment of the present invention;

FIG. 4B illustrates a payload of the first signaling information according to an exemplary embodiment of the present invention;

FIG. 5 illustrates information acquired from service composition information and the first signaling information according to an exemplary embodiment of the present invention;

FIG. 6 illustrates a list of broadcasting services created by using the service composition information, according to an exemplary embodiment of the present invention;

FIG. 7 illustrates a method of providing a broadcasting service in the broadcast data receiving apparatus shown in FIG. 2, according to an exemplary embodiment of the present invention;

FIG. 12 illustrates a syntax of a body of the first signaling information according to an exemplary embodiment of the present invention;

FIG. 13 illustrates an example of an 'FICdescriptor( )' field when a 'tag' field has a value of '0x01', according to an exemplary embodiment of the present invention;

FIG. 14 illustrates an example of the 'FICdescriptor( )' field when the 'tag' field has a value of '0x02', according to an exemplary embodiment of the present invention;

DETAILED DESCRIPTION OF THE INVENTION

Hereinafter, exemplary embodiments of the present invention will be described in detail with reference to the appended drawings.

Figure 1:
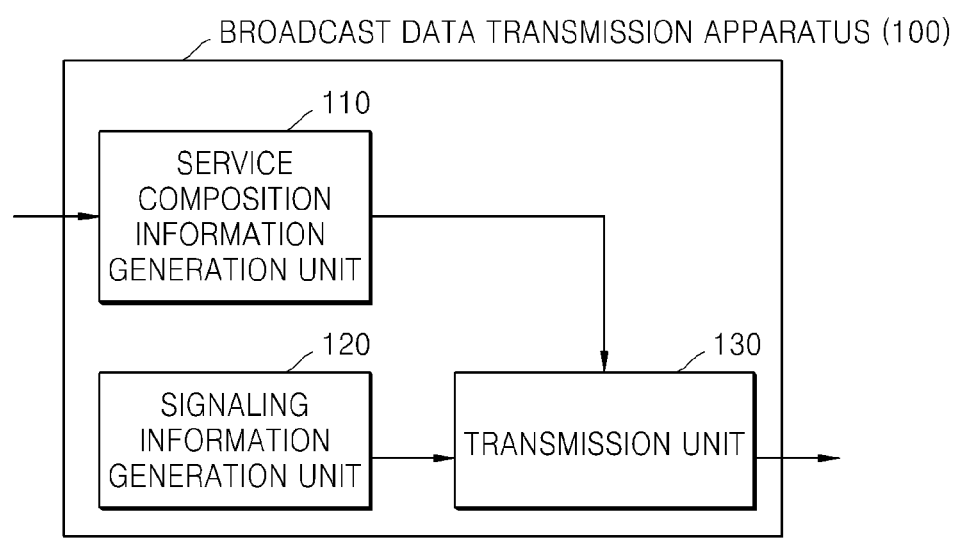
FIG. 1 is a block diagram of a broadcast data transmission apparatus according to an exemplary embodiment of the present invention.

FIG. 1 is a block diagram of a broadcast data transmission apparatus 100 according to an exemplary embodiment of the present invention.

The broadcast data transmission apparatus 100 includes a service composition information generation unit 110, a signaling information generation unit 120, and a transmission unit 130.

The service composition information generation unit 110 generates composition information of a broadcasting service to be provided using broadcast packets transmitted through at least one frequency channel. The service composition information may include information about the type of broadcasting service to be provided through at least one channel and a detailed description of the broadcasting service. Throughout the specification, a frequency channel refers to a channel modulated by using vestigial sideband (VSB) modulation. A plurality of pieces of service composition information may be transmitted through one frequency channel. However, hereinafter it is assumed for convenience of explanation that one piece of service composition information is transmitted through one frequency channel. The service composition information may include only composition information of broadcasting services to be provided through a frequency channel that carries the service composition information, but may also include composition information of broadcasting services to be provided through other frequency channels.

The service composition information may include at least one selected from the group consisting of a service identifier for identifying each broadcasting service, genre information representing a genre of each broadcasting service, and short description information of each broadcasting service. The service composition information may also include mapping information between a broadcasting service and an IP address of a broadcast packet providing the broadcasting service, or mapping information between a broadcasting service and second signaling information (described below) corresponding to the broadcasting service. The above-described items of information are only examples of the service composition information, and any information about broadcasting services may be included as the service composition information.

The signaling information generation unit 120 generates first signaling information indicating an ensemble in which the service composition information is to be transmitted. Throughout the specification, the ensemble refers to a data transmission unit that is divided according to an error coding unit. At least one ensemble may be transmitted through the same frequency transmission channel. The first signaling information may be assigned an identification number of the ensemble in which the service composition information is transmitted, and thus may indicate the ensemble in which the service composition information is transmitted. In addition, the first signaling information may include version information of the service composition information in order to indicate whether the service composition information has been updated.

The first signaling information may include mapping information between a broadcasting service and an ensemble. In other words, the first signaling information may include information about an ensemble in which each broadcasting service is provided.

In addition, the first signaling information may include an IP address of second signaling information corresponding to each broadcasting service.

The signaling information generation unit 120 may further generate second signaling information. The second signaling information, which is necessary for processing a broadcast packet to be transmitted in an ensemble, is generated for each ensemble. Examples of the second signaling information may include an IP mapping table (IMT), a service mapping table (SMT), or the like. The second signaling information may include a description of a broadcasting service provided in broadcast packets in an ensemble and IP addresses of the broadcast packets.

If the IP address of the second signaling information is an IP address preassigned by the broadcast data transmission apparatus 100 and a broadcast data receiving apparatus, described below, the broadcast data receiving apparatus is aware of the IP address of the second signaling information, and thus, the broadcast data transmission apparatus 100 does not additionally transmit the IP address of the second signaling information to the broadcast data receiving apparatus.

However, if the broadcast data receiving apparatus is not aware of the IP address of the second signaling information, the broadcast data transmission apparatus 100 may transmit the IP address of the second signaling information to the broadcast data receiving apparatus. In the latter case, the IP address of the second signalling information may be included in at least one selected from the group consisting of the service composition information and the first signaling information. For example, mapping information between a broadcasting service identifier and an IP address of the second signaling information corresponding to the broadcasting service identifier may be included in at least one selected from the group consisting of the service composition information and the first signaling information. The second signaling information corresponding to the broadcasting service identifier refers to second signaling information that is used to process a broadcasting service represented by the broadcasting service identifier and, in more detail, that is used to process a broadcast packet providing the corresponding broadcasting service.

The transmission unit 130 transmits broadcast packets, the service composition information, and the first signaling information.

The transmission unit 130 may transmit the first signaling information through an FIC. Throughout the specification, the FIC refers to an ensemble coded to be more robust against errors than other ensembles. At least one FIC is included in each frequency channel.

The transmission unit 130 transmits the service composition information in an ensemble indicated by the first signaling information and transmits broadcast packets in the other ensembles. The ensemble in which the service composition information is transmitted may contain only the service composition information or may contain the service composition information as well as the broadcast packets.

Figure 2:
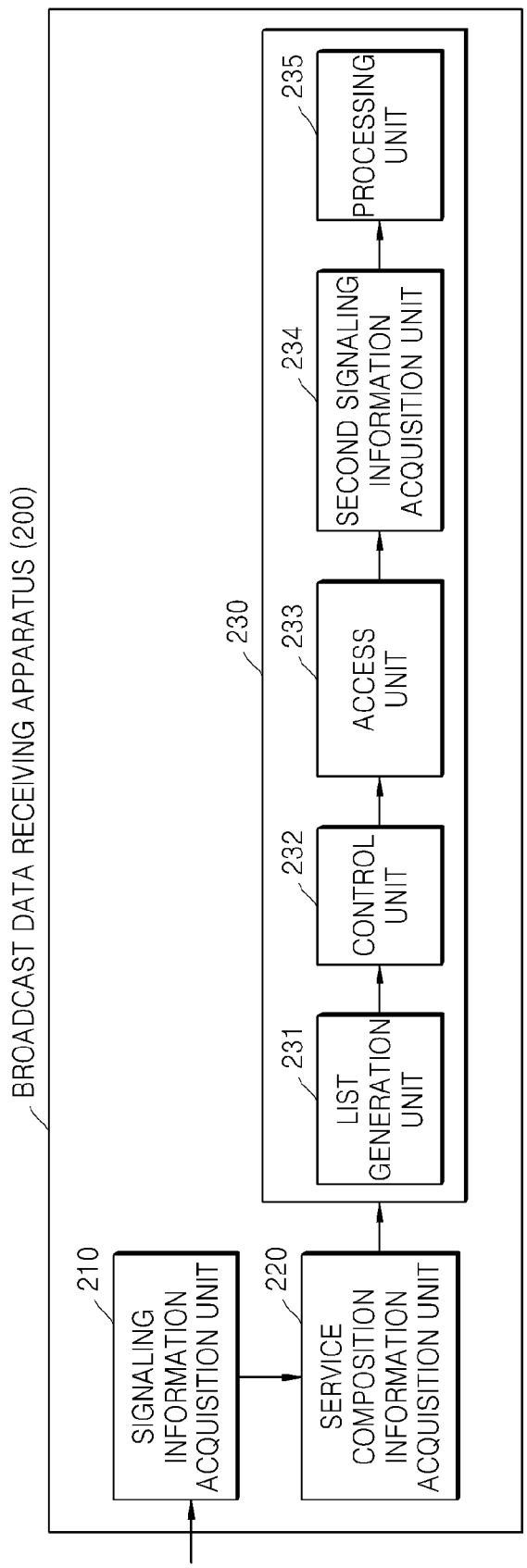
FIG. 2 is a block diagram of a broadcast data receiving apparatus according to an exemplary embodiment of the present invention.

FIG. 2 is a block diagram of a broadcast data receiving apparatus 200 according to an exemplary embodiment of the present invention.

The broadcast data receiving apparatus 200 includes a signaling information acquisition unit 210, a service composition information acquisition unit 220, and a service providing unit 230.

The signaling information acquisition unit 210 may acquire the first signaling information indicating the ensemble in which the service composition information of a broadcasting service is transmitted. The service composition information includes information about the compositions of all broadcasting services provided using a broadcast packet transmitted through at least one frequency channel. The signaling information acquisition unit 210 may acquire the first signaling information through an FIC.

The service composition information acquisition unit 220 acquires the composition information based on the first signaling information. Since the first signaling information includes information about which ensemble the service composition information is transmitted in, the service composition information acquisition unit 220 may acquire the composition information from the ensemble based on the first signaling information.

The service providing unit 230 provides a broadcasting service selected by a user based on the service composition information and the first signaling information. In order to allow the user to easily select a desired broadcasting service, the service providing unit 230 may include a list generation unit 231, a control unit 232, an access unit 233, a second signaling information acquisition unit 234, and a processing unit 235.

The list generation unit 231 generates a list of broadcasting services to be provided, based on the service composition information. With the assumption that a piece of service composition information is transmitted through one frequency channel, the list generation unit 231 generates a list of broadcasting services to be provided by the broadcast data receiving apparatus 200, using at least one piece of service composition information transmitted, respectively, through a plurality of frequency channels.

The control unit 232 controls outputting of the list of broadcasting services. The control unit 232 controls the list of broadcasting services to be output through an output device such as a display device or a speaker. The user may select one of the broadcasting services in the output list of broadcasting services.

The access unit 233 accesses an ensemble in which a broadcast packet providing a broadcasting service selected by the user is transmitted. The service composition information includes a service identifier for identifying the selected broadcasting service, and the first signaling information includes mapping information between the service identifier and the ensemble. Thus, the access unit 233 may selectively access the ensemble providing the broadcasting service selected by the user, using the service composition information and the first signaling information.

The second signaling information acquisition unit 234 acquires second signaling information from the accessed ensemble. The second signaling information is necessary for processing broadcast packets transmitted in the ensemble and may include information about which broadcasting service is to be provided in the ensemble and information about the IP addresses of the broadcast packets providing the broadcast service.

When the broadcast data transmission apparatus 100 and the broadcast data receiving apparatus 200 have preassigned an IP address of the second signaling information, the second signaling information acquisition unit 234 may acquire the second signaling information by obtaining a broadcast packet having the preassigned IP address in the accessed ensemble, without the need for additional information.

However, when the broadcast data transmission apparatus 100 and the broadcast data receiving apparatus 200 have not preassigned the IP address of the second signaling information, the IP address of the second signaling information may be included in at least one selected from the group consisting of the service composition information and the first signaling information. In this case, the second signaling information acquisition unit 234 may acquire the IP address of the second signaling information from at least one selected from the group consisting of the first signaling information and the service composition information.

The processing unit 235 processes the broadcast packets providing the selected broadcasting service using the second signaling information.

In an exemplary embodiment, the list generation unit 231 and the control unit 232 may not be included in the broadcast data receiving apparatus 200. Alternatively, the list generation unit 231 and the control unit 232 may be included in the broadcast data receiving apparatus 200 and may operate only when the broadcast data receiving apparatus 200 starts to operate, when a receiving area is changed, when requested by the user, when a version of the service composition information is changed, and/or when the broadcast data receiving apparatus 200 is initialized. In another exemplary embodiment, the list generation unit 231 and the control unit 232 may provide the list of broadcasting services to allow the user to select a broadcasting service, using the previously received service composition information or first signaling information when the broadcast data receiving apparatus 200 operates.

FIG. 3 illustrates syntax of the service composition information according to an exemplary embodiment of the present invention. A Channel Description Table (CDT) in FIG. 3 is an example of the service composition information. In addition, a 'channel' in FIG. 3 is distinguished from the 'frequency channel' used throughout the specification, and is related to the concept of a broadcasting service.

An 'M1_info_type' field 310 represents a type of data. In FIG. 3, the 'M1_info_type' field 310 has a value of '0x02', and fields below the 'M1_info_type' field 310 relate to the service composition information.

A 'channel_identifier' field 320 is used to identify broadcasting services.

A 'channel_type' field 330 represents types of broadcasting services, i.e., genres of broadcasting services. Genres of broadcasting services may be variously classified, for example, into movie, sports, drama, news, animation, women/culture, baby/child, documentary, education, and entertainment.

Genre information may also be expressed, for example, as an audio service, an audio/video (A/V) service, a data service, or the like.

A 'virtual_channel_status' field 340 represents a current status of a broadcasting service. For example, the 'virtual_channel_status' field 340 may represent whether the broadcasting service is 'active' or 'inactive'. An 'active' status refers to a status where the current broadcasting service is available, and an 'inactive' status refers to a status where the current broadcasting service is not available. An 'inactive' status may also refer to a status where all broadcast packets for the broadcasting service are not transmitted.

In addition, the 'virtual_channel_status' field 340 may represent whether the broadcasting service is 'hidden'. A status where the broadcasting service is 'hidden' may refer to a status where broadcast packets providing the broadcast service are transmitted, but are not seen by the user.

A 'base_channel_indicator' field 350 represents whether the corresponding broadcasting service is associated with other broadcasting services. For example, assuming that the broadcast data transmission apparatus 100 provides all the content of a high-quality broadcasting service that is the same as that of a low-quality broadcasting service, the 'base_channel_indicator' field 350 may represent whether the broadcasting service is from the low-quality broadcasting service or the high-quality broadcasting service. In addition, the 'base_channel_indicator' field 350 may include description information of a broadcast service associated with other broadcasting services. In this case, the 'base_channel_indicator' field 350 may include an identifier of the high-quality (or low-quality) broadcasting service and an identifier of an ensemble providing the high-quality broadcasting service (or low-quality broadcasting service).

A 'short_channel_description' field 360 may include a short description of the broadcasting service. The 'short_channel_description' field 360 may include any information that describes the broadcasting service. For example, the 'short_channel_description' field 360 may include information on a broadcast service provider which provides the corresponding broadcasting service.

A 'channel_descriptor_loop' field 370 represents a detailed description of the broadcasting service. For example, detailed genre information of the broadcasting service may be included in the 'channel_descriptor_loop' field 370.

The syntax in FIG. 3 is merely an example of the service composition information, and the service composition information may further include an IP address of a broadcast packet providing the broadcasting service, an IP address of the second signaling information necessary for processing the broadcast packet, or an identifier of an ensemble providing the broadcasting service.

FIGS. 4A and 4B illustrate syntax of the first signaling information according to an exemplary embodiment of the present invention.

FIG. 4A illustrates a header of the first signaling information according to an exemplary embodiment of the present invention.

A 'transport_stream_id' field 412 represents an identifier of a stream transmitted through a frequency channel.

An 'ESG_version' field 414 represents a version of electronic service guide (ESG) data. The ESG data is metadata of the broadcasting service.

An 'IMT_version' field 416 represents a version of IMT data. The IMT data may include mapping information between the IP address of the broadcast packets and information about the locations of the broadcast packets in the ensemble. In other words, the IMT data represents where in the ensemble the broadcast packets are located.

A 'CDT_version' field 418 represents version information of the channel description table (CDT).

FIG. 4B illustrates a payload of the first signaling information according to an exemplary embodiment of the present invention.

An 'ensemble_id' field 422 is an identifier of the ensemble.

A 'primary_ensemble_indicator' field 424 represents whether the corresponding ensemble is a primary ensemble. A primary ensemble refers to an ensemble defined to be accessed before other ensembles. Thus, the 'primary_ensemble_indicator' field 424 may indicate an ensemble in which the CDT is transmitted.

An 'SG_entry_point_indicator' field 426 represents whether a service guide (SG) is included in the corresponding ensemble.

A 'num_channels' field 428 represents the number of broadcasting services provided through the corresponding ensemble.

A 'channel_type' field 432 refers to the form in which broadcasting services are provided. For example, the 'channel_type' field 432 may represent whether a broadcasting service is an audio service, an A/V service, a data service, or an urgent information service.

A 'virtual_channel_status' field 434 represents a status of the broadcasting service. For example, the 'virtual_channel_status' field 434 may represent whether the broadcasting service is 'active', 'inactive', 'hidden', or the like, as described above.

A 'primary_channel_indicator' field 436 represents a primary broadcasting service. For example, the 'primary_channel_indicator' field 436 may indicate a broadcasting service in the ensemble to be provided first from among other broadcasting services, and may indicate, for example, the second signaling information.

An 'SP_indicator' field 438 represents whether at least one of the components necessary for providing the corresponding broadcasting service has been encrypted or scrambled.

A 'major_channel_num' field 442 and a 'minor_channel_num' field 444 contain information for identifying the broadcasting service, and are classified according to predetermined criteria. For example, the 'major_channel_num' field 442 may be classified according to service providers. Broadcasting services provided by the same service provider may have the same value for the 'major_channel_num' field 442. In addition, the 'minor_channel_num' field 444 may be classified according to broadcasting services provided by an identical service provider.

Information on which broadcasting service is provided in each ensemble may be acquired from the two For loops in the first signaling information according to an exemplary embodiment of the present invention.

FIG. 5 illustrates information acquired from service composition information and first signaling information according to an exemplary embodiment of the present invention. The information acquired from the service composition information and the first signaling information includes a service identifier 510, an IP address 520, and an ensemble identifier 530.

Referring to FIG. 5, service #1 corresponds to second signaling information which is provided in ensembles #1 and #3 and has IP addresses of 222.0.0.1 and 222.0.0.2. In other words, broadcast packets providing the service #1 are transmitted in ensembles #1 and #3 and are processed by using the second signaling information having the IP addresses of 222.0.0.1 and 222.0.0.2.

It is assumed that a user has requested the service #1. The broadcast data receiving apparatus initially accesses the ensemble #1 to acquire a broadcast packet having an IP address of '222.0.0.1' and then accesses the ensemble #3 to acquire a broadcast packet having an IP address of '222.0.0.2'. The acquired broadcast packets contain the second signaling information, and the broadcast data receiving apparatus may acquire the IP addresses of the broadcast packets providing the service #1 by processing the second signaling information. Then, the broadcast data receiving apparatus may provide the service #1 by selectively processing only the broadcast packets providing the service #1.

FIG. 6 illustrates a list of broadcasting services created using service composition information, according to an exemplary embodiment of the present invention.

The list of broadcasting services includes a broadcast channel number 610, broadcast channel information 620, upper-genre information 630, and lower-genre information 640.

Throughout the specification, the concept of the broadcast channel number 610, which allows the user to easily identify broadcasting services, is different from that of physical frequency channels. The broadcast channel number 610 may have the format of 'major broadcast channel number'-'minor broadcast channel number'. Herein, the 'major broadcast channel number' may be used to identify a broadcasting station (i.e., the service provider) providing a broadcasting service, and the 'minor broadcast channel number' may be used to identify individual broadcasting services provided by the same service provider. In FIG. 6, the 'major broadcast channel number' for a broadcasting service provided by a 'broadcasting station A' is '10', and the 'major broadcast channel number' for a broadcasting service provided by a 'broadcasting station D' is '12'.

In another exemplary embodiment of the present invention, the broadcast channel number 610 may include a single channel number and may be transmitted.

The broadcast channel information 620 is a description of a corresponding broadcast channel. The broadcast channel information 620 may include any information about broadcast channels. For example, the broadcast channel information 620 may include brief information about a service provider of a broadcasting service provided through a broadcast channel, information about a genre of the broadcasting service provided through the broadcast channel, or the like.

The upper-genre information 630 represents an upper genre of a currently provided broadcasting service. Upper genres may be variously classified according to embodiments. For example, upper genres of broadcasting services may be classified into drama, movie, sports, news, and metadata.

The lower-genre information 640 represents sub-genres of broadcasting services. Information indicating what the broadcasting service is about may be provided more accurately based on the lower-genre information 640. In other words, the upper-genre information 630 may represent an upper category of genres, one of which the broadcasting service belongs to, and the lower-genre information 640 may represent a lower category of genres, one of which the broadcasting service belongs to.

FIG. 7 illustrates a method of providing a broadcasting service in the broadcast data receiving apparatus 200, according to an exemplary embodiment of the present invention.

When a user starts to operate the broadcast data receiving apparatus 200 or initializes the broadcast data receiving apparatus 200, broadcast channel scanning begins. The broadcast data receiving apparatus 200 may provide a list of broadcast channels available to the user by scanning the broadcast channels.

The broadcast channels may be scanned according to the following two methods.

Firstly, the broadcast channels may be scanned using service composition information 721 included in a primary ensemble 720.

The broadcast data receiving apparatus 200 acquires first signaling information 710 from the FIC. The first signaling information 710 includes information necessary for processing broadcast packets transmitted in at least one ensemble of the ensembles 730-1, 730-2, 730-N.

Referring to FIG. 7, the first signaling information 710 may include a service identifier, IP information, version information, genre information, and an ensemble identifier.

The IP information represents an IP address of second signaling information necessary for providing a broadcasting service corresponding to a service identifier.

The version information represents a version of the second signaling information.

The genre information represents a genre of the broadcasting service corresponding to a service identifier.

The ensemble identifier represents an ensemble providing the broadcasting service corresponding to a service identifier.

Although not illustrated in FIG. 7, the first signaling information 710 may further include information indicating the primary ensemble 720 in which the service composition information 721 is transmitted. In addition, the IP address of the second signaling information and the genre information may be exclusively included in the service composition information 721, and may be not included in the first signaling information 710.

Next, the broadcast data receiving apparatus 200 accesses the primary ensemble 720 transmitting the service composition information 721, based on the first signaling information 710, and acquires the service composition information 721 from the accessed primary ensemble 720.

The broadcast data receiving apparatus 200 repeats the above-described processes on all the frequency channels to acquire all the service composition information 721.

Then, the broadcast data receiving apparatus 200 creates the list of broadcast channels by processing the service composition information 721 and provides the list of broadcast channels to the user.

Secondly, the broadcast channels may be scanned without using the service composition information 721.

The broadcast data receiving apparatus 200 receives the first signaling information 710 from the FIC. The first signaling information 710 includes an IP address of the second signaling information.

The broadcast data receiving apparatus 200 acquires the second signaling information from each ensemble 730-1, 730-2, . . . , 730-N using the IP address of the second signaling information. The second signaling information includes information necessary for processing broadcast packets transmitted in the corresponding ensemble and information on the broadcasting service to be provided by the corresponding ensemble.

The broadcast data receiving apparatus 200 creates the list of broadcast channels by processing the second signaling information and then provides the list of broadcast channels to the user.

The latter method may take a longer time since the broadcast data receiving apparatus 200 acquires the second signaling information by accessing every ensemble. However, in the former method, the broadcast data receiving apparatus 200 may scan the broadcast channels by accessing one ensemble to acquire only the service composition information 721, and thus, it takes less time to scan the broadcast channels.

Once scanning of the broadcast channels has been completed through the above-described processes, the created list of broadcasting services may be provided to the user unless there are exceptional circumstances, such as when the service composition information 721 is updated, when there is a user's request, or when the broadcast data receiving apparatus 200 is initialized. In all exceptional circumstances, the broadcast channel scanning is performed again.

When the list of broadcasting services is provided, the user selects one of the broadcasting services included in the list. If the user does not select one of the broadcasting services, a broadcasting service corresponding to the most recently selected broadcast channel may be selected. Alternatively, a broadcasting service corresponding to a broadcast channel set as default may be selected.

When the user selects a broadcasting service, the broadcast data receiving apparatus 200 accesses an ensemble providing the selected broadcasting service, using the first signaling information 710. The first signaling information 710 includes information indicating which ensemble each broadcasting service is transmitted in, as described above.

The broadcast data receiving apparatus 200 acquires the second signaling information from the accessed ensemble. The second signaling information may optionally have an IP address preassigned by both the broadcast data transmission apparatus 100 and the broadcast data receiving apparatus 200. When the second signaling information includes an IP address preassigned by both the broadcast data transmission apparatus 100 and the broadcast data receiving apparatus 200, the broadcast data receiving apparatus 200 acquires a broadcast packet having the preassigned IP address from the accessed ensemble. When the second signaling information does not include a preassigned IP address, an IP address of the second signaling information is identified based on the service composition information 721 included in the primary ensemble 720, or the first signaling information 710, and a broadcast packet having the identified IP address is acquired.

When the second signaling information has been acquired, the broadcast data receiving apparatus 200 acquires IP addresses of the broadcast packets providing the broadcasting service selected by the user from the second signaling information. The second signaling information may include the IP addresses of the broadcast packets providing each broadcasting service, as described above.

Finally, the broadcast data receiving apparatus 200 provides the broadcasting service selected by the user by processing the broadcast packets acquired from the accessed ensemble.

It is assumed in FIG. 7 that a user has selected a broadcasting service #1 represented by a service identifier #1.

Referring to the first signaling information 710, broadcast packets providing the broadcasting service #1 are transmitted in ensemble #1, indicated by an ensemble identifier #1. Thus, the broadcast data receiving apparatus 200 acquires the second signaling information by accessing the ensemble #1 (730-1). IP addresses of the broadcast packets providing the broadcast service #1 are identified from the acquired second signaling information, and the broadcast packets are acquired by using the identified IP addresses.

Next, the broadcast data receiving apparatus 200 provides the broadcast service #1 by processing the acquired broadcast packets.

Figure 8:
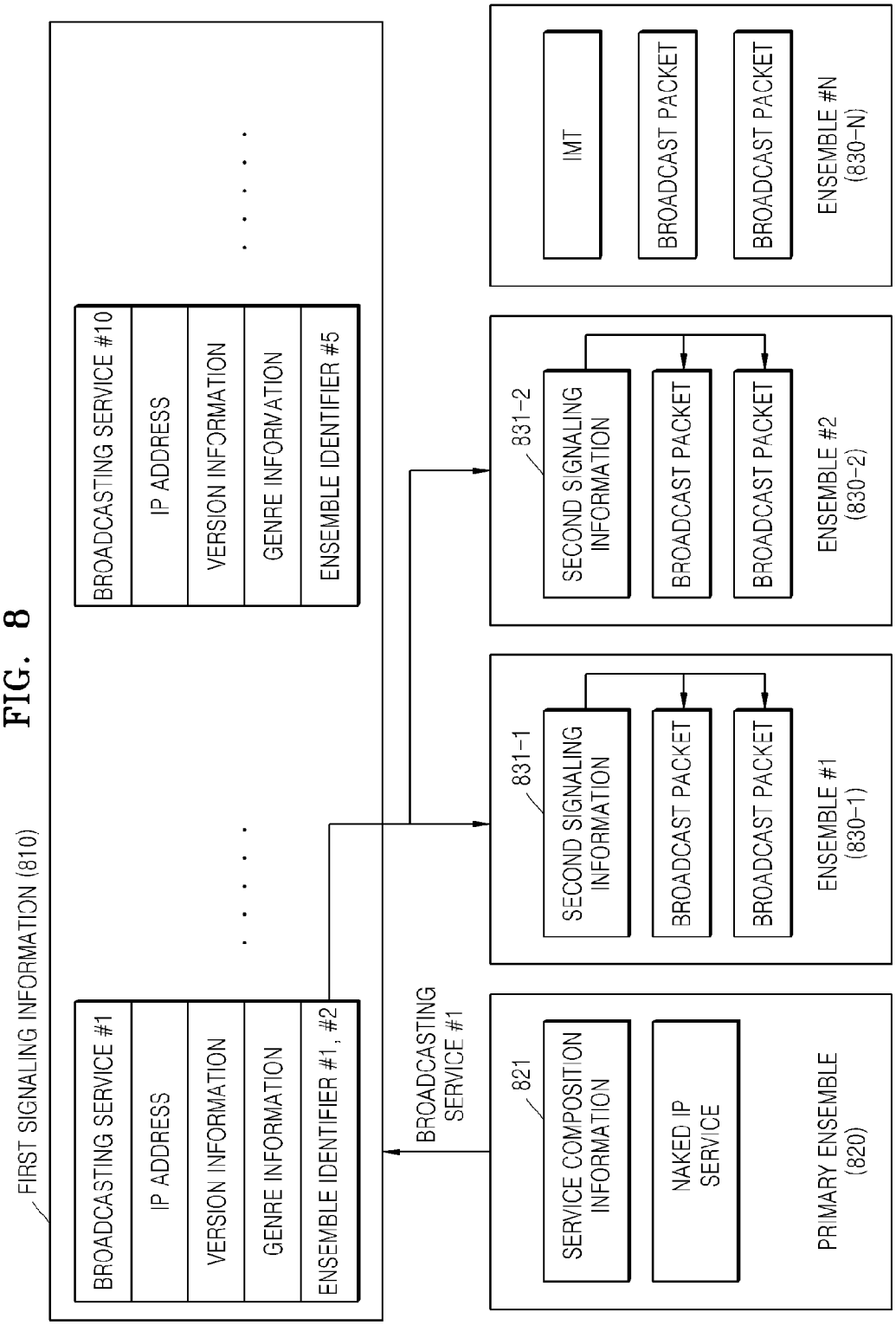
FIG. 8 illustrates a method of providing a broadcasting service in the broadcast data receiving apparatus shown in FIG. 2, according to another exemplary embodiment of the present invention.

FIG. 8 illustrates a method of providing a broadcasting service in the broadcast data receiving apparatus 200, according to another exemplary embodiment of the present invention.

FIG. 8 illustrates a case where broadcast packets providing a broadcasting service are transmitted in at least two ensembles of the ensembles 830-1, 830-2, 830-N.

It is also assumed in FIG. 8 that a user has selected the broadcasting service #1 represented by the service identifier #1.

Referring to the first signaling information 810, broadcast packets providing the broadcasting service #1 are transmitted in ensembles #1 and #2.

In another exemplary embodiment of the present invention, the broadcasting service #1 may be provided by processing all the broadcast packets transmitted in both the ensembles #1 and #2. Alternatively, the broadcasting service #1 may be provided at a low quality by processing only the broadcast packets transmitted in the ensemble #1, or may be provided at a high quality by processing up to the broadcast packets transmitted in the ensemble #2, in addition to the broadcast packets transmitted in the ensemble #1.

The broadcast data receiving apparatus 200 identifies IP addresses of the broadcast packets by acquiring second signaling information 831-1 from the ensemble #1 (830-1) and second signaling information 831-2 from the ensemble #2 (830-2). The IP address of the second signaling information 831-1 and the IP address of the second signaling information 831-2 may be included in service composition information 821 included in a primary ensemble 820.

Next, the broadcast data receiving apparatus 200 acquires the broadcast packets for the broadcasting service #1 by using the acquired IP addresses and provides the broadcasting service #1 by processing the broadcast packets.

Figure 9:
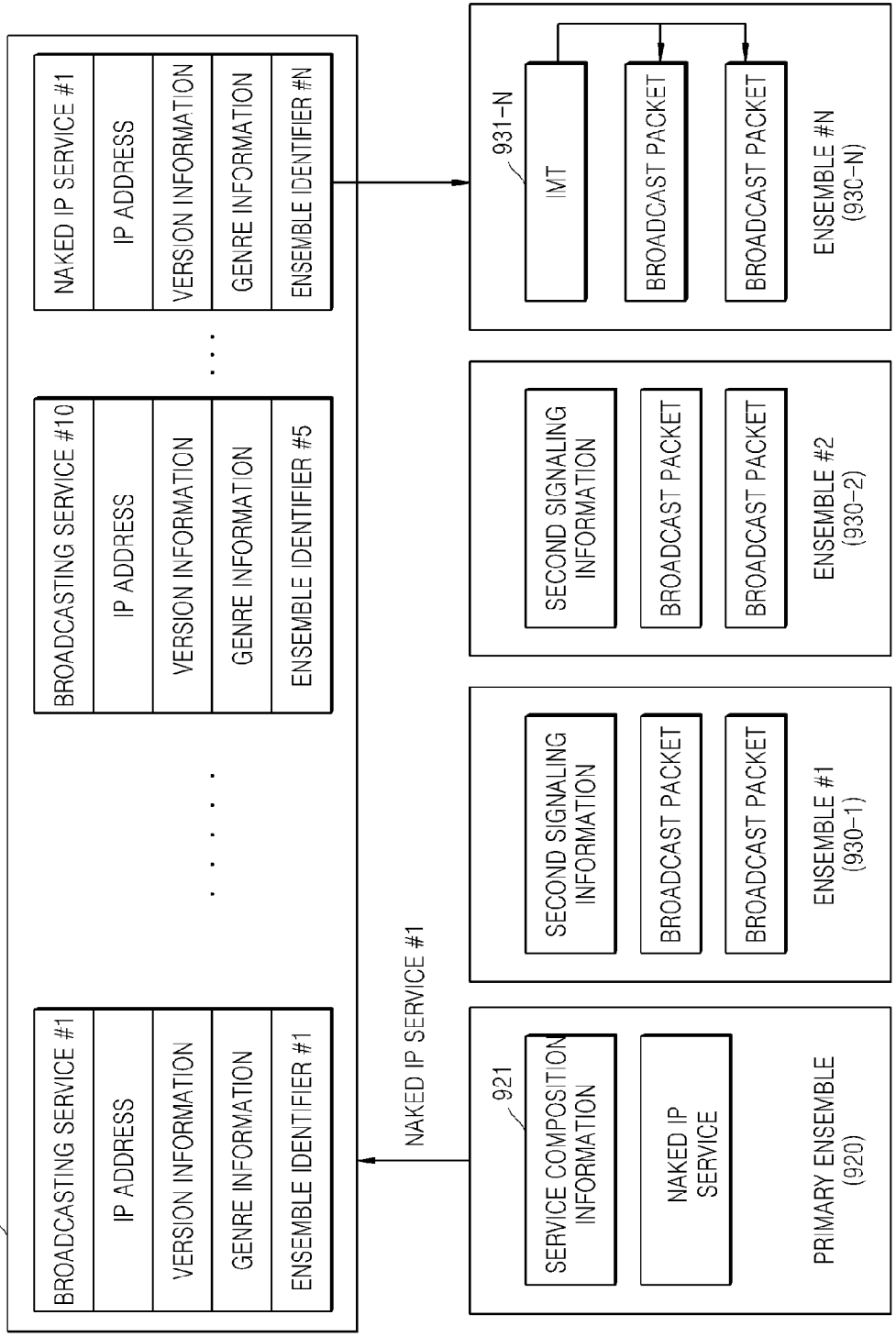
FIG. 9 illustrates a method of providing a broadcasting service in the broadcast data receiving apparatus shown in FIG. 2, according to another exemplary embodiment of the present invention.

FIG. 9 illustrates a method of providing a broadcasting service in the broadcast data receiving apparatus 200, according to another exemplary embodiment of the present invention. FIG. 9 illustrates a case where a naked IP service is provided by at least one ensemble of the ensembles 930-1, 930-2, 930-N.

It is assumed in FIG. 9 that a user has selected a naked IP service #1.

Throughout the specification, the naked IP service refers to a service provided by processing broadcast packets by using signaling information that is different in form from general broadcasting services. A larger variety of services may be provided by using the naked IP service.

Referring to the first signaling information 910, broadcast packets providing the naked IP service #1 are provided in an ensemble #N (930-N). In order to process the broadcast packets providing the naked IP service, third signaling information that is different in form from the second signaling information is used. Thus, at least one selected from the group consisting of the first signaling information 910 and the service composition information 921 included in a primary ensemble 920 includes a flag indicating the naked IP service, and naked IP service information including an IP address of the third signaling information.

In FIG. 9, an IMT is illustrated as an example of the third signaling information. The IMT, which contains information indicating the locations of the broadcast packets transmitted in the ensemble, includes mapping information between the IP addresses of the broadcast packets and the locations of the broadcast packets in the ensemble.

The broadcast data receiving apparatus 200 acquires an IMT (931-N) by accessing the ensemble #N (930-N). Next, the broadcast data receiving apparatus 200 may provide the naked IP service #1 by acquiring desired broadcast packets based on the IMT (931-N).

Figure 10:
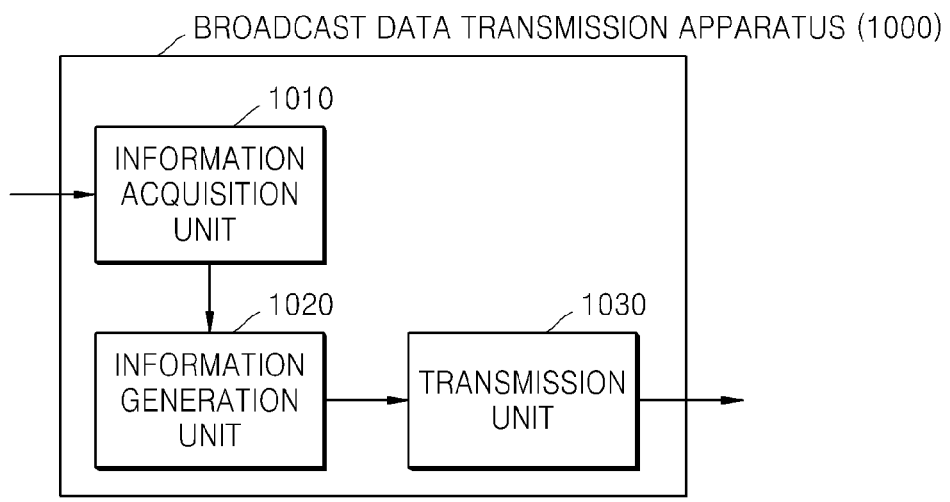
FIG. 10 is a block diagram of a broadcast data transmission apparatus according to another exemplary embodiment of the present invention.

FIG. 10 is a block diagram of a broadcast data transmission apparatus 1000 according to an exemplary embodiment of the present invention.

The broadcast data transmission apparatus 1000 includes an information acquisition unit 1010, an information generation unit 1020, and a transmission unit 1030.

The information acquisition unit 1010 acquires urgent information that is prioritized to be received by a broadcast data receiving apparatus. The urgent information may be set in various ways. For example, the urgent information may include information that is prioritized to be transmitted, such as information about decoding of broadcast packets providing a broadcasting service, and any information prioritized to be transmitted, such as accident information, weather information, etc.

The urgent information may include at least one selected from the group consisting of type information representing a type of urgent information, short description information on urgent information, and location information of an ensemble in which detailed description information about the urgent information is transmitted.

The type information is information representing the type of data to which the urgent information relates. For example, the type information may represent which type of information among accident information, digital rights management (DRM) information, and weather information is transmitted as the urgent information.

The type information may be represented by using the 'channel_type' field 432 in FIG. 4B. In this case, it is possible to rapidly signal the information about the ensemble in which the urgent information is transmitted, without an additional 'description'.

The short description information about the urgent information may include text information to be provided to the user. The user may request the detailed description information after having checked the short description information about the urgent information. However, when the detailed description information about the urgent information is transmitted through the FIC, the bandwidth of the FIC may be insufficient to transmit the detailed description information. Thus, the detailed description information about the urgent information may be transmitted by using an ensemble, and the location information of the ensemble in which the detailed description information about the urgent information is transmitted may be included in the signaling information. If the user requests the detailed description information about the urgent information, a broadcast data receiving apparatus, which will be described below, accesses the ensemble in which the detailed description information about the urgent information is transmitted, using the location information of the ensemble.

An ensemble identifier for identifying ensembles may be used as the location information of the ensemble.

The information generation unit 1020 generates signaling information that includes information necessary for processing the broadcast packets providing a broadcasting service, and also includes the urgent information.

The transmission unit 1030 transmits the signaling information through the FIC.

Figure 11:
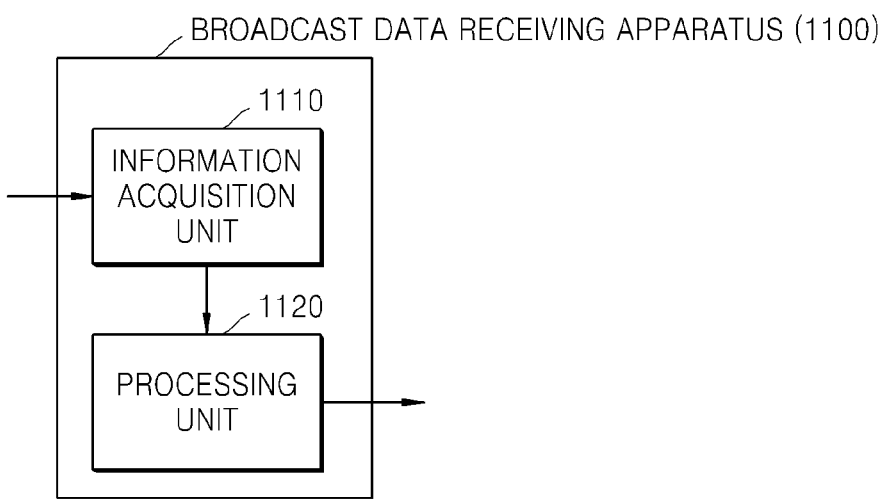
FIG. 11 is a block diagram of a broadcast data receiving apparatus according to another exemplary embodiment of the present invention.

FIG. 11 is a block diagram of a broadcast data receiving apparatus 1100 according to another exemplary embodiment of the present invention.

The broadcast data receiving apparatus 1100 includes an information acquisition unit 1110 and a processing unit 1120.

The information acquisition unit 1110 acquires signaling information from an FIC. The signaling information may include information necessary for processing the broadcast packets providing a broadcasting service, and the urgent information prioritized to be received by the broadcast data receiving apparatus 1100.

The 'channel_type' field 432 of the first signaling information in FIG. 4B may indicate whether the urgent information is present or not.

The urgent information may include information prioritized be received by the broadcast data receiving apparatus, such as accident status information, weather information, etc., or information about decoding broadcast packets.

The urgent information may include at least one selected from the group consisting of type information representing a type of the urgent information, short description information about the urgent information, and location information of an ensemble in which detailed description information about the urgent information is transmitted.

The processing unit 1120 acquires the urgent information by processing the signaling information. The urgent information is used to process a broadcast packet or may be output to the user according to the type of urgent information. The processing unit 1120 may further include an output unit (not shown). The urgent information may be output to the user through the output unit if needed.

When the processing unit 1120 receives the urgent information, a currently provided broadcasting service may be stopped so that the urgent information is prioritized to be output.

The processing unit 1120 may include a storage unit (not shown), an output unit (not shown), and a control unit (not shown).

When the urgent information is received, the control unit stops providing the current broadcasting service, and controls the storage unit to store process information regarding processing of the current broadcasting service. The process information may include any kind of information to provide the suspended broadcasting service. For example, the process information may include a next position of the current broadcasting service to be provided and data which has been generated during the provision of the current broadcasting service.

Next, the output unit outputs the urgent information.

If an urgent situation corresponding to the urgent information terminates or if a termination request is received from the user, the control unit controls the output unit to resume providing the suspended broadcasting service.

FIG. 12 illustrates a syntax of a body of the first signaling information according to an exemplary embodiment of the present invention.

In FIG. 12, a 'num_of descriptor' field 1210 represents the number of pieces of urgent information to be transmitted in the first signaling information.

A 'tag' field 1220 represents the type of urgent information. Exemplary values of the 'tag' field 1220 are defined in Table 1.

TABLE 1

| 0x01 | accident information |
|------|----------------------|
| 0x02 | CAS/DRM decoding information |
| 0xxx | Reserved |

Referring to Table 1, when the 'tag' field 1220 has a value of '0x01', an 'FlCdescriptorQ' field 1230 represents accident information. In addition, when the 'tag' field 1220 has a value of '0x02', the 'FlCdescriptorQ' field 1230 represents CAS/DRM decoding information.

FIG. 13 illustrates an example of the 'FICdescriptor( )' field 1230 when the 'tag' field 1220 has a value of '0x01', according to an exemplary embodiment of the present invention.

An 'accident_main_type' field 1310 represents information about the type of accident information.

An 'accident_sub_type' field 1320 represents additional information about the type of accident information. For example, the 'accident_main_type' field 1310 may represent an upper category of the accident information, and the 'accident_sub_type' field 1320 may represent a lower category of the accident information. For example, when the 'accident_main_type' field 1310 represents a 'natural accident', the 'accident_sub_type' field 1320 may represent one selected from the group consisting of 'flood', 'forest fire', and 'earthquake'.

An 'ensemble_id' field 1330 represents information about the location of an ensemble in which the detailed accident information is transmitted. In other words, information indicating which ensemble the detailed accident information is transmitted in is represented by an ensemble identifier.

An 'accident_description' field 1340 includes a brief description of the accident information.

FIG. 14 illustrates an example of the 'FICdescriptor( )' field 1230 when the 'tag' field 1220 has a value of '0x02', according to an exemplary embodiment of the present invention.

A 'segmentation_number' field 1410 represents the number of segments when the data is segmented.

A 'last_segment_number' field 1420 represents the number of the last segment when the data is segmented.

A 'key_stream_main_type' field 1430 represents identification information of a data stream transmitting an encryption key.

A 'key_stream_sub_type' field 1440 represents additional identification information of the data stream transmitting the encryption key.

An 'ensemble_id' field 1450 represents indication information of an ensemble in which detailed information about decoding of data is transmitted. In other words, information indicating which ensemble the detailed information about decoding is transmitted in is represented by an ensemble identifier.

A 'key_stream_length' field 1460 represents length information of the data stream transmitting the encryption key.

A 'key_stream' field 1470 represents information on the encryption key.

An 'additional_key_stream_descriptor_length' field 1480 represents length information of the data stream transmitting the additional key stream descriptor.

An 'additional_key_stream_descriptor( )' field 1490 represents additional information about the encryption key.

Figure 15:
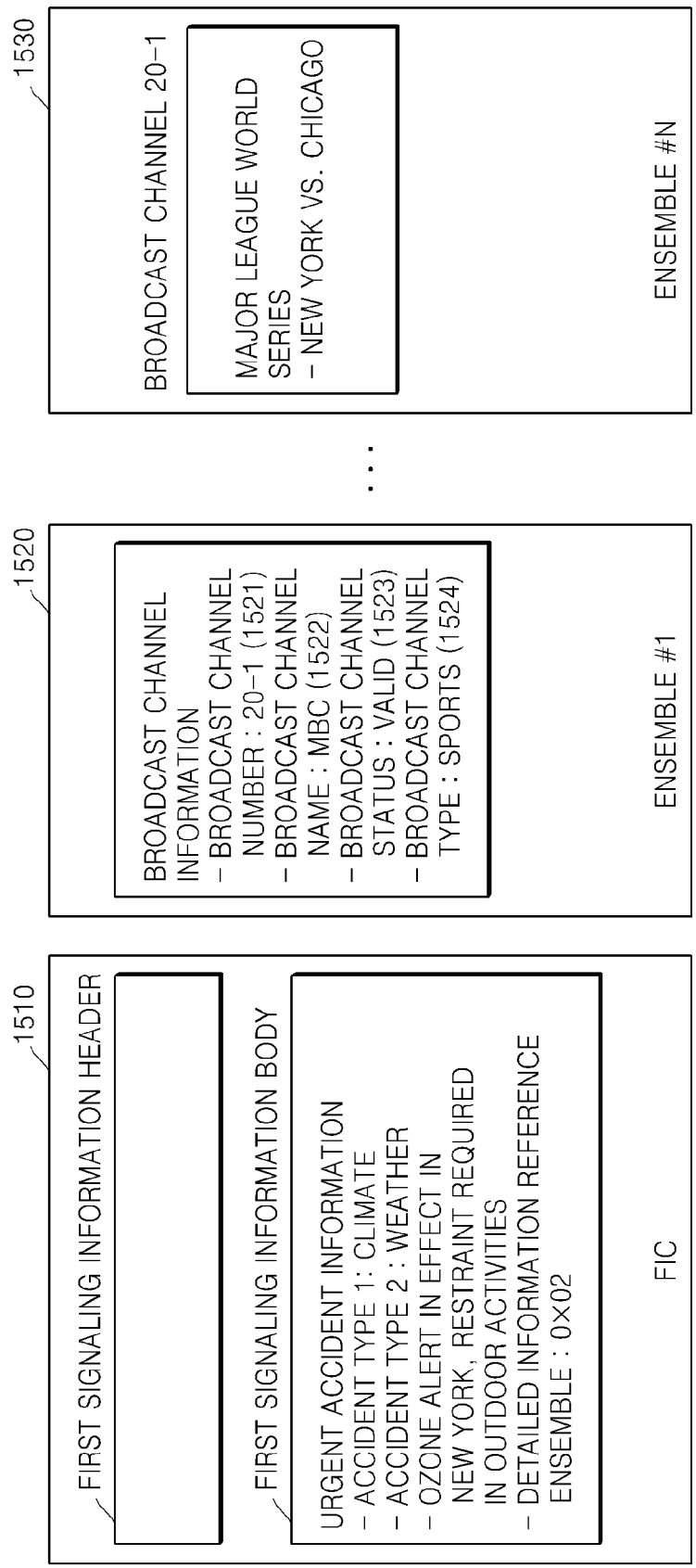
FIG. 15 illustrates examples of configurations of a signaling information channel and ensembles, according to an exemplary embodiment of the present invention.

FIG. 15 illustrates examples of configurations of FIC channels and ensembles, according to an exemplary embodiment of the present invention.

An FIC 1510 includes first signaling information consisting of a first signaling information header and a first signaling information body. The first signaling information may include urgent information prioritized to be received by a broadcast data receiving apparatus or information used to process broadcast packets providing a broadcasting service.

In FIG. 15, when the first signaling information provides accident information, detailed information about the accident information is transmitted in an ensemble with an identifier of '0x02'.

An ensemble #1 1520 includes service composition information. The ensemble #1 1520 is indicated by the first signaling information.

In FIG. 15, broadcast channel information corresponds to the service composition information. The broadcast channel information includes a broadcast channel number 1521, a broadcast channel name 1522, a broadcast channel status 1523, and a broadcast channel type 1524.

An ensemble #N 1530 transmits a broadcasting service corresponding to a broadcast channel 20-1.

Figure 16:
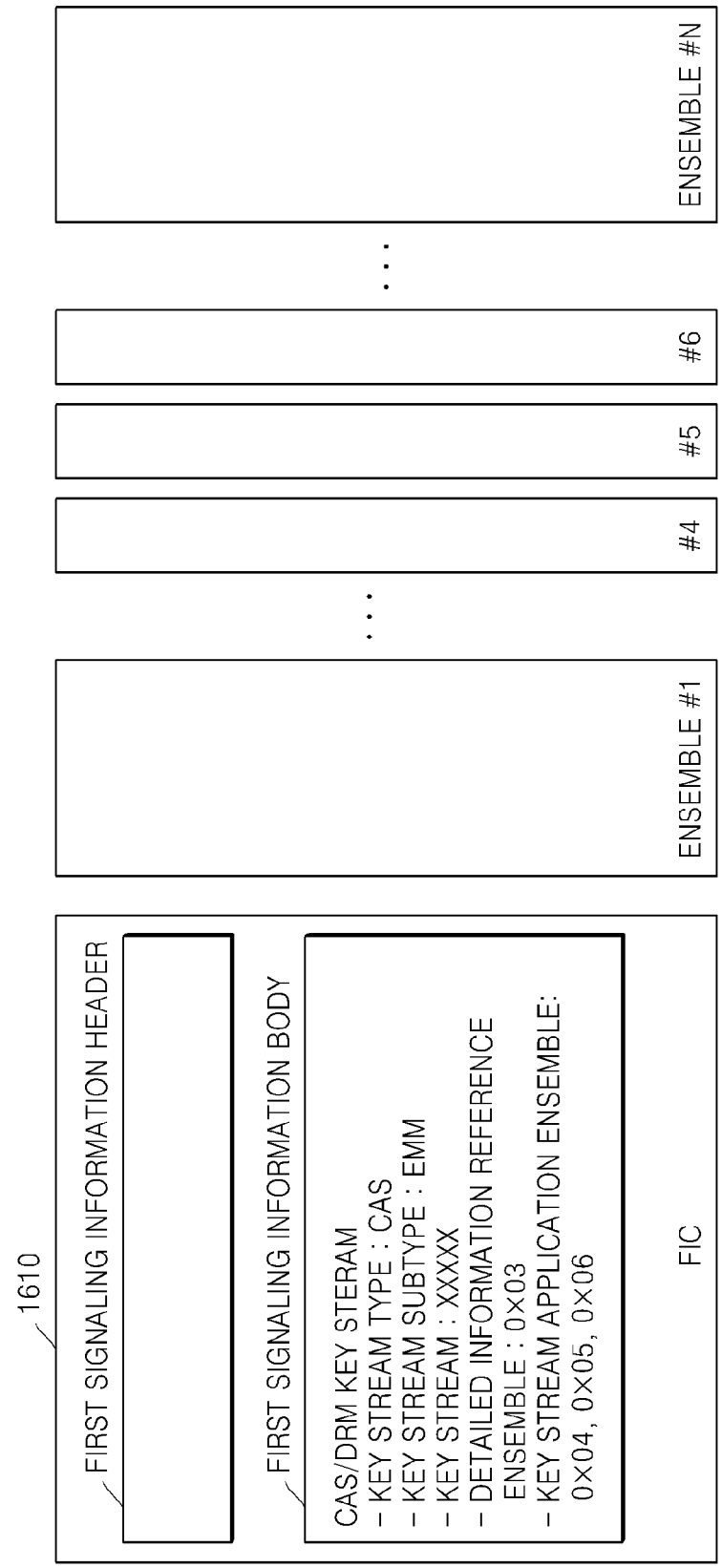
FIG. 16 illustrates examples of configurations of a signaling information channel and ensembles, according to another exemplary embodiment of the present invention.

FIG. 16 illustrates examples of configurations of an FIC 1610 and ensembles, according to another exemplary embodiment of the present invention.

In FIG. 16, the first signaling information provides decoding information. A detailed description of the decoding information is transmitted in an ensemble with an identifier of '0x03', and data streams that have been encrypted are transmitted in ensembles, respectively, with identifiers '0x03', '0x04', '0x05', and '0x06'.

Figure 17:
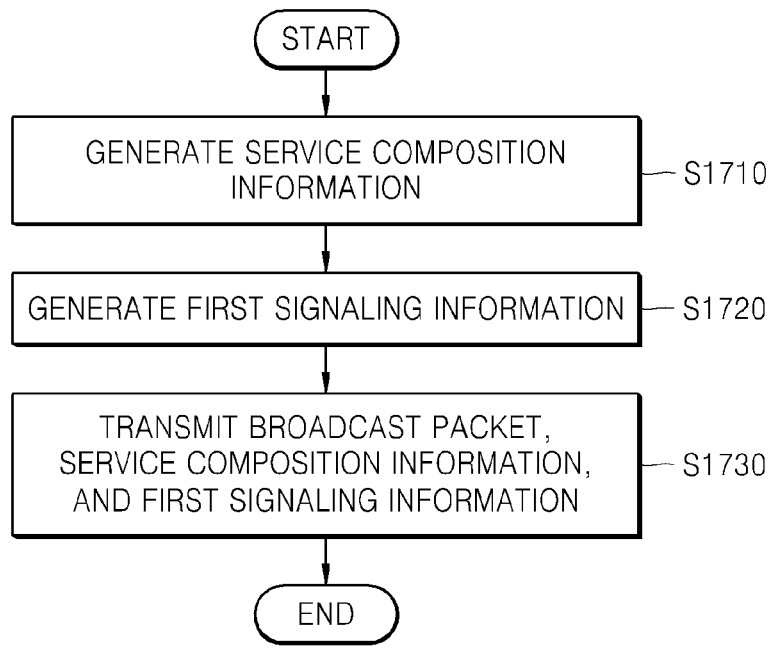
FIG. 17 is a flowchart of a broadcast data transmission method according to an exemplary embodiment of the present invention.

FIG. 17 is a flowchart of a broadcast data transmission method according to an exemplary embodiment of the present invention.

In operation S1710, service composition information of a broadcasting service to be provided using broadcast packets transmitted through at least one frequency channel is generated.

In operation S1720, first signaling information indicating an ensemble in which the service composition information is to be transmitted is generated.

In operation S1730, the broadcast packets, the service composition information and the first signaling information are transmitted.

Figure 18:
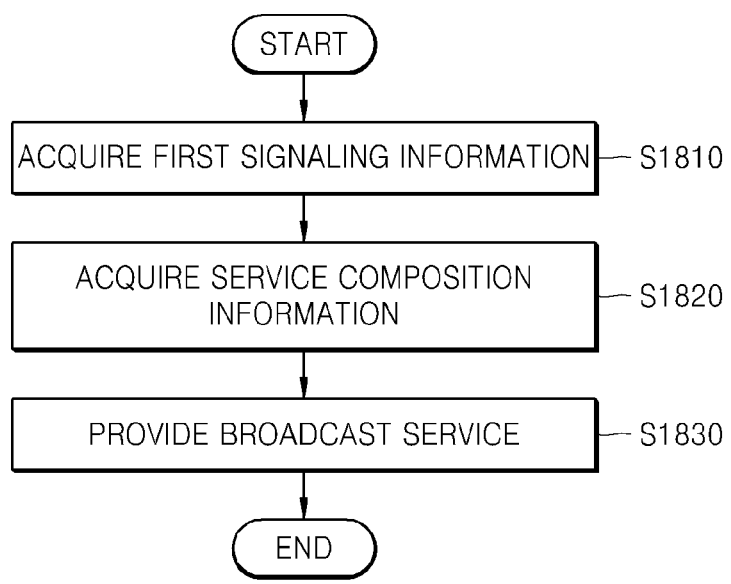
FIG. 18 is a flowchart of a broadcast data receiving method according to an exemplary embodiment of the present invention.

FIG. 18 is a flowchart of a broadcast data receiving method according to an exemplary embodiment of the present invention.

In operation S1810, first signaling information indicating an ensemble in which composition information of a broadcasting service is transmitted is acquired. Service composition information refers to the composition information of a broadcasting service provided by using broadcast packets transmitted through at least one frequency channel.

In operation S1820, the service composition information is acquired based on the first signaling information.

In operation S1830, the broadcasting service is provided based on the service composition information and the first signaling information.

Figure 19:
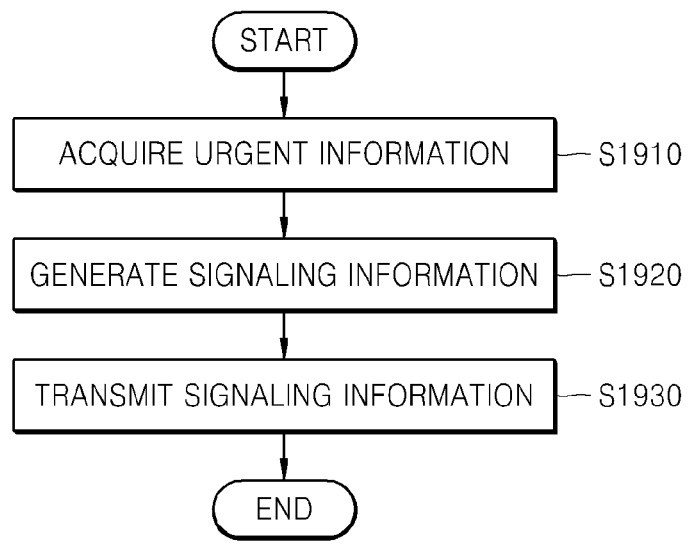
FIG. 19 is a flowchart of a broadcast data transmission method according to another exemplary embodiment of the present invention.

FIG. 19 is a flowchart of a broadcast data transmission method according to another exemplary embodiment of the present invention.

In operation S1910, urgent information which is prioritized to be received by a broadcast data receiving apparatus is acquired. The urgent information may include at least one selected from the group consisting of accident status information, weather information, and information about decoding of broadcast packets. The urgent information may include at least one selected from the group consisting of type information representing the type of urgent information, short description information about the urgent information, and location information of an ensemble in which detailed description information about the urgent information is transmitted.

In operation S1920, signaling information including information necessary for processing broadcast packets providing a broadcasting service, and including the urgent information, is generated.

In operation S1930, the signaling information is transmitted through an FIC.

Figure 20:
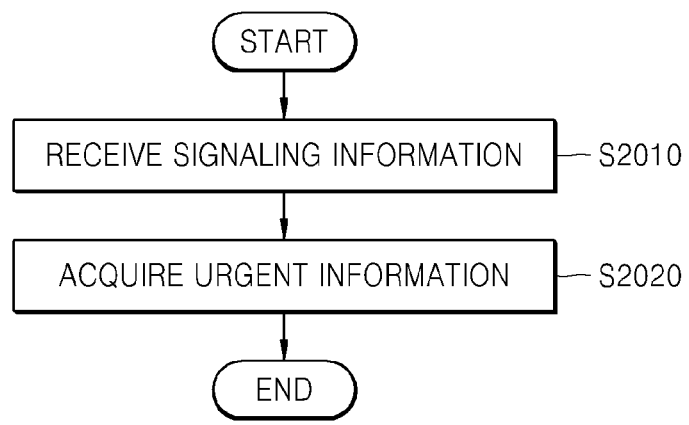
FIG. 20 is a flowchart of a broadcast data receiving method according to an exemplary embodiment of the present invention.

FIG. 20 is a flowchart of a broadcast data receiving method according to an exemplary embodiment of the present invention.

In operation S2010, signaling information including urgent information which is prioritized to be received, and information necessary for processing broadcast packets providing a broadcasting service, is received through an FIC.

In operation S2020, the urgent information is acquired from the signaling information.

Exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.) and optical recording media (e.g., CD-ROMs, or DVDs).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A broadcast data transmission method comprising:
    generating service composition information of a broadcasting service to be provided using at least one broadcast packet transmitted through at least one frequency channel;
    generating first signaling information indicating an ensemble in which the service composition information is to be transmitted; and
    transmitting the at least one broadcast packet, the service composition information, and the first signaling information,
    wherein the service composition information comprises at least one selected from a group consisting of a service identifier for the broadcasting service, genre information representing a genre of the broadcasting service, and information about a provider of the broadcasting service.

2. The method of claim 1, further comprising generating second signaling information for each ensemble, the second signaling information including information for processing the at least one broadcast packet to be transmitted in each ensemble,
    wherein the transmitting further comprises transmitting the second signaling information in each ensemble.

3. The method of claim 1, wherein the first signaling information comprises mapping information between the broadcasting service and the ensemble in which the at least one broadcast packet providing the broadcasting service is to be transmitted.

4. The method of claim 1, wherein the first signaling information comprises version information of the service composition information.

5. The method of claim 1, wherein the transmitting comprises transmitting the service composition information in an ensemble indicated by the first signaling information and transmitting the first signaling information through a fast information channel.

6. A broadcast data transmission method comprising:
    acquiring urgent information which is prioritized to be received by a broadcast data receiving apparatus;
    generating signaling information including information for processing a broadcast packet providing a broadcasting service and the urgent information; and
    transmitting the signaling information through a fast information channel (FIC), wherein the urgent information comprises location information of an ensemble in which detailed description information about the urgent information is transmitted.

7. The method of claim 6, wherein the urgent information further comprises at least one selected from a group consisting of accident status information, weather information, and information about decoding of the broadcast packet.

8. The method of claim 6, wherein the urgent information further comprises at least one selected from a group consisting of type information representing a type of the urgent information, and short description information about the urgent information.

9. A broadcast data receiving method comprising:
acquiring first signaling information indicating an ensemble in which service composition information of a broadcasting service is transmitted;
acquiring the service composition information based on the first signaling information; and
providing the broadcasting service based on the service composition information and the first signaling information,
wherein the service composition information is information on a composition of the broadcasting service to be provided using a broadcast packet transmitted through at least one frequency channel, and
the service composition information comprises at least one selected from a group consisting of a service identifier for the broadcasting service, genre information representing a genre of the broadcasting service, and information about a provider of the broadcasting service.

10. The method of claim 9, wherein the providing the broadcasting service comprises:
creating a list of broadcast services to be provided based on the service composition information;
controlling displaying of the list of broadcasting services; and
if one of the broadcasting services in the list is selected, accessing an ensemble in which a broadcast packet providing the selected broadcasting service is transmitted.

11. The method of claim 10, wherein the providing of the broadcasting service further comprises:
acquiring second signaling information from each ensemble, the second signaling information including information for processing the broadcast packet providing the selected broadcasting service; and
processing the broadcast packet providing the selected broadcasting service using the second signaling information.

12. The method of claim 9, further comprising:
storing at least one selected from a group consisting of the service composition information and the first signaling information; and
creating a list of broadcasting services to be provided based on the at least one selected from a group consisting of the service composition information and the first signaling information.

13. The method of claim 9, wherein the first signaling information further comprises mapping information between the broadcasting service and an ensemble in which the broadcast packet providing the broadcasting service is transmitted.

14. The method of claim 9, wherein the first signaling information further comprises version information of the service composition information.

15. The method of claim 9, wherein the acquiring the first signaling information comprises acquiring the first signaling information through a fast information channel.

16. A broadcast data receiving method comprising:
receiving signaling information including information necessary for processing a broadcast packet providing a broadcasting service and urgent information from a fast information channel; and
acquiring the urgent information based on the signaling information,
wherein the urgent information comprises location information of an ensemble in which detailed description information about the urgent information is transmitted.

17. The method of claim 16, wherein the urgent information further comprises at least one selected from a group consisting of accident status information, weather information, and information on decoding the broadcast packet.

18. The method of claim 16, wherein the urgent information further comprises at least one selected from a group consisting of type information representing a type of the urgent information, and short description information about the urgent information.

19. The method of claim 16, wherein the location information of the ensemble is transmitted in an ensemble_id field in the signaling information.

20. The method of claim 16, further comprising prioritizing outputting of the received urgent information.

21. The method of claim 20, wherein the outputting comprises:
stopping provision of a current broadcasting service and storing process information regarding processing of the current broadcasting service;
outputting the urgent information; and
if an urgent situation corresponding to the urgent information terminates or if a termination request is received, resuming the suspended broadcasting service using the stored process information.

22. A broadcast data transmission apparatus comprising:
a service composition information generation unit which generates service composition information of a broadcasting service to be provided using a broadcast packet transmitted through at least one frequency channel;
a signaling information generation unit which generates first signaling information indicating an ensemble in which the service composition information is to be transmitted; and
a transmission unit which transmits the broadcast packet, the service composition information, and the first signaling information,
wherein the service composition information comprises at least one selected from a group consisting of a service identifier for the broadcasting service, genre information representing a genre of the broadcasting service, and information about a provider of the broadcasting service.

23. A broadcast data transmission apparatus comprising:
an information acquisition unit which acquires urgent information that is prioritized to be received by a broadcast data receiving apparatus;
an information generation unit which generates signaling information including information for processing a broadcast packet providing a broadcasting service and including the urgent information; and
a transmission unit which transmits the signaling information through a fast information channel,
wherein the urgent information comprises location information of an ensemble in which detailed description information about the urgent information is transmitted.

24. A broadcast data receiving apparatus comprising:
a signaling information acquisition unit which acquires first signaling information indicating an ensemble in which service composition information of a broadcasting service is transmitted;
a service composition information acquisition unit which acquires the service composition information based on the first signaling information; and
a service providing unit which provides the broadcasting service based on the service composition information and the first signaling information,
wherein the broadcasting service is provided using a broadcast packet transmitted through at least one frequency channel, and
the service composition information comprises at least one selected from a group consisting of a service identifier for the broadcasting service, genre information representing a genre of the broadcasting service, and information about a provider of the broadcasting service.

25. A broadcast data receiving apparatus comprising:
a signaling information reception unit which receives signaling information including information for processing a broadcast packet providing a broadcasting service and urgent information from a fast information channel (FIC); and
an urgent information acquisition unit which acquires the urgent information based on the signaling information,
wherein the urgent information comprises location information of an ensemble in which detailed description information about the urgent information is transmitted.

26. A non-transitory computer readable recording medium having recorded thereon a computer program which, when executed by a computer, causes the computer to execute a broadcast data transmission method comprising:
generating service composition information of a broadcasting service to be provided using at least one broadcast packet transmitted through at least one frequency channel;
generating first signaling information indicating an ensemble in which the service composition information is to be transmitted; and
transmitting the at least one broadcast packet, the service composition information, and the first signaling information,
wherein the service composition information comprises at least one selected from a group consisting of a service identifier for the broadcasting service, genre information representing a genre of the broadcasting service, and information about a provider of the broadcasting service.

27. A non-transitory computer readable recording medium having recorded thereon a computer program which, when executed by a computer, causes the computer to execute a broadcast data transmission method comprising:
acquiring urgent information which is prioritized;
generating signaling information including information for processing a broadcast packet providing a broadcasting service and the urgent information; and
transmitting the signaling information through a fast information channel (FIC),
wherein the urgent information comprises location information of an ensemble in which detailed description information about the urgent information is transmitted.

28. A non-transitory computer readable recording medium having recorded thereon a computer program which, when executed by a computer, causes the computer to execute a broadcast data receiving method comprising:
acquiring first signaling information indicating an ensemble in which service composition information of a broadcasting service is transmitted;
acquiring the service composition information based on the first signaling information; and
providing the broadcasting service based on the service composition information and the first signaling information,
wherein the service composition information is information on a composition of the broadcasting service to be provided using a broadcast packet transmitted through at least one frequency channel, and
the service composition information comprises at least one selected from a group consisting of a service identifier for the broadcasting service, genre information representing a genre of the broadcasting service, and information about a provider of the broadcasting service.

29. A non-transitory computer readable recording medium having recorded thereon a computer program which, when executed by a computer, causes the computer to execute a broadcast data receiving method comprising:
receiving signaling information including information for processing a broadcast packet providing a broadcasting service and urgent information from a fast information channel; and
acquiring the urgent information based on the signaling information,
wherein the urgent information comprises location information of an ensemble in which detailed description information about the urgent information is transmitted.

30. The method of claim 1, wherein the first signaling information comprises an identification number of the ensemble in which the service composition information is transmitted.

31. The method of claim 30, wherein the identification number of the ensemble is transmitted in an ensemble_id field in the first signaling information.

* * * * *